(12) United States Patent
Agüera y Arcas

(10) Patent No.: US 7,254,271 B2
(45) Date of Patent: *Aug. 7, 2007

(54) METHOD FOR ENCODING AND SERVING GEOSPATIAL OR OTHER VECTOR DATA AS IMAGES

(75) Inventor: Blaise Agüera y Arcas, Seattle, WA (US)

(73) Assignee: Seadragon Software, Inc., Seattle, WA (US)

( * ) Notice: Subject to any disclaimer, the term of this patent is extended or adjusted under 35 U.S.C. 154(b) by 171 days.

This patent is subject to a terminal disclaimer.

(21) Appl. No.: 11/082,556

(22) Filed: Mar. 17, 2005

(65) Prior Publication Data

US 2005/0270288 A1    Dec. 8, 2005

Related U.S. Application Data

(63) Continuation-in-part of application No. 10/854,117, filed on May 26, 2004, now Pat. No. 7,042,455, and a continuation-in-part of application No. 10/803,010, filed on Mar. 17, 2004, now Pat. No. 7,133,054, and a continuation-in-part of application No. 10/790,253, filed on Mar. 1, 2004, now Pat. No. 7,075,535.

(60) Provisional application No. 60/622,867, filed on Oct. 28, 2004, provisional application No. 60/617,485, filed on Oct. 8, 2004, provisional application No. 60/475,897, filed on Jun. 5, 2003, provisional application No. 60/474,313, filed on May 30, 2003, provisional application No. 60/453,897, filed on Mar. 12, 2003, provisional application No. 60/452,075, filed on Mar. 5, 2003.

(51) Int. Cl.
*G06K 9/36* (2006.01)
*G06K 9/46* (2006.01)

(52) U.S. Cl. .............. 382/232; 382/253; 382/299; 382/302; 382/305; 345/428

(58) Field of Classification Search ........... 382/232, 382/253, 299, 274, 302, 305; 715/850; 345/428
See application file for complete search history.

(56) References Cited

U.S. PATENT DOCUMENTS

| | | | |
|---|---|---|---|
| 4,532,605 A | 7/1985 | Waller | |
| 5,471,572 A | 11/1995 | Buchner | |
| 5,590,250 A | * 12/1996 | Lamping et al. | ............ 345/427 |
| 5,666,475 A | 9/1997 | Salesin | |
| 5,999,187 A | 12/1999 | Dehmlow | |

(Continued)

OTHER PUBLICATIONS

TDB-ACC-No. NN 961137☐☐Disclosure Title: Multidimensional Index Structure With Multi-Level Entry and Skip-Level Search for Partially-Specified Queries.☐☐Publication-Data: IBM Technical Disclosure Bulletin, Nov. 1996, US.*

(Continued)

*Primary Examiner*—Jingge Wu
*Assistant Examiner*—Ali Bayat
(74) *Attorney, Agent, or Firm*—Shook, Hardy & Bacon L.L.P.

(57) ABSTRACT

A system and method are disclosed which include providing a first layer of an image, the first layer including features of the image having locations within the first layer; and providing a second layer of the image, the second layer including data blocks corresponding to respective ones of the features; each data block being in a location in the second layer substantially corresponding to a location in the first layer of the feature corresponding to each data block, wherein a size and shape of the second layer substantially correspond to a size and shape of said first layer.

25 Claims, 9 Drawing Sheets

U.S. PATENT DOCUMENTS

| | | | |
|---|---|---|---|
| 6,002,406 A | 12/1999 | Zhao | |
| 6,034,661 A | 3/2000 | Servan-Scheiber | |
| 6,154,213 A | 11/2000 | Rennison | |
| 6,184,894 B1 | 2/2001 | Rosman | |
| 6,204,850 B1 | 3/2001 | Green | |
| 6,204,857 B1 | 3/2001 | Piazza | |
| 6,348,921 B1* | 2/2002 | Zhao et al. | 345/428 |
| 6,356,659 B1* | 3/2002 | Wiskott et al. | 382/209 |
| 6,360,029 B1 | 3/2002 | Moller | |
| 6,373,495 B1 | 4/2002 | Lin | |
| 6,392,661 B1 | 5/2002 | Tankersley | |
| 6,453,330 B1 | 9/2002 | Battle | |
| 6,476,829 B1 | 11/2002 | Smith | |
| 6,501,482 B1 | 12/2002 | Rosman | |
| 6,639,598 B2 | 10/2003 | Piazza | |
| 6,650,326 B1 | 11/2003 | Huber | |
| 6,907,345 B2 | 6/2005 | Shipley | |
| 6,909,965 B1* | 6/2005 | Beesley et al. | 701/209 |
| 6,912,462 B2 | 6/2005 | Ogaki | |
| 6,927,782 B2 | 8/2005 | Coldefy | |
| 6,943,811 B2 | 9/2005 | Matthews | |
| 7,072,764 B2 | 7/2006 | Donath | |
| 2001/0030647 A1 | 10/2001 | Sowizral | |
| 2004/0128070 A1* | 7/2004 | Schmidt et al. | 701/211 |

OTHER PUBLICATIONS

Bill Overall, Foveated Image: Applications to Image and Video Compress, Mar. 12, 1999, http://scien.standord, edu/class/psych221/projects/99/wro.

Foley et al., Computer Graphics: Priniciples and Practice, Addison-Wesley Publishing Company Inc., 1997, p. 166-170.

Hierarchical Data Structures, CS488/688: Introduction to Interactive Computer Graphics, University of Waterloo, Feb. 18, 2001, http://web.archive.org/web/2001028051725/http:/medialab.di.unipi.it/web/IUM/Waterloo/node73.html.

How to Read a United States National Grid (USNG) Spatial Address, 2000, http:/www.xyproject.org/How%20Read%20USNG/How%20to%20read%20USNG.htm.

Mix-in class for Parent Figures, May 10, 2000. http://web.archive.org/web/20030510164335/http://openhealth.com/bw/doc/auto/Parent.html.

Reading Topographic Maps, Feb. 14, 2003, http://web.archive.org/web/20030214004603/http://www.map-reading.com/ch4-3,php.

Space Variant Imaging, Nov. 25, 2002, http://web.archive/org/web/20021125075827/http://www.svi.cps.utexas.edu/index.htm.

The Annotated VRML 97 Reference, 1999, http://accad.osu.edu/~pgerstma/class/vnv/resources/info/AnnotatedVrmlRef/ch1.htm.

* cited by examiner

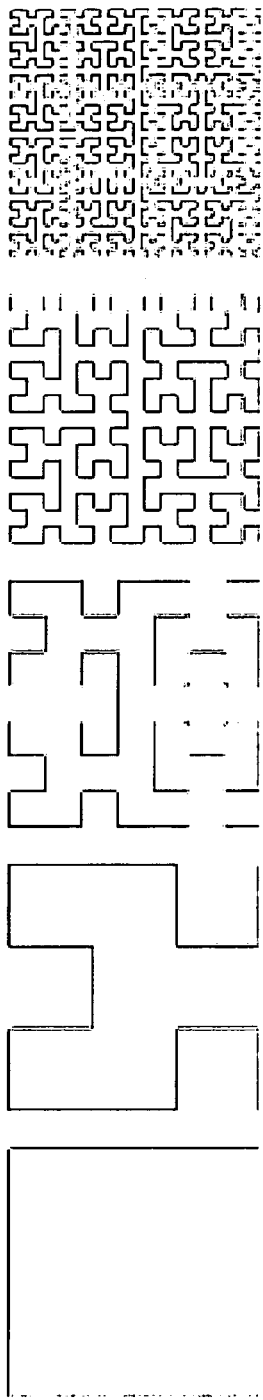
FIG. 6
FIG. 7
FIG. 8
FIG. 9
FIG. 10
FIG. 11

METHOD FOR ENCODING AND SERVING GEOSPATIAL OR OTHER VECTOR DATA AS IMAGES

CROSS-REFERENCE TO RELATED APPLICATIONS

This application claims the benefit of U.S. Provisional Patent Application Ser. No. 60/622,867, filed Oct. 28, 2004, entitled "METHOD FOR ENCODING AND SERVING GEOSPATIAL OR OTHER VECTOR DATA AS IMAGES," the entire disclosure of which is hereby incorporated herein by reference; this application also claims the benefit of U.S. Provisional Patent Application Ser. No. 60/617,485, filed Oct. 8, 2004, entitled "Method for Spatially Encoding Large Texts, Metadata, and Other Coherently Accessed Non-Image Data, the entire disclosure of which is incorporated herein by reference; this application is a Continuation-In-Part application of U.S. patent application Ser. No. 10/790,253, filed Mar. 1, 2004, now U.S. Pat. No. 7,075,535, entitled "System and Method for Exact Rendering In a Zooming User Interface", the entire disclosure of which is incorporated herein by reference, which application claims the benefit of the following U.S. Provisional Patent Applications: Provisional Application Ser. No. 60/452,075, filed Mar. 5, 2003, entitled "System and Method for Exact Rendering in a Zooming User Interface", Provisional Application Ser. No. 60/453,897, filed Mar. 12, 2003, entitled "System and Method for Foveated, Seamless, Progressive Rendering in a Zooming User Interface", Provisional Application Ser. No. 60/475,897, filed Jun. 5, 2003, entitled "System and Method for the Efficient, Dynamic, and Continuous Display of Multiresolution Visual Data", and Provisional Application Ser. No. 60/474,313, filed May 30, 2003, entitled "System and Method for Infinite Precision Coordinates in a Zooming User Interface", the entire disclosures of which provisional patent applications are all incorporated herein by reference; this application is also a Continuation In Part application of U.S. patent application Ser. No. 10/854,117, filed May 26, 2004, now U.S. Pat. No. 7,042,455, entitled "A System And Method For Multiple Node Display," the entire disclosure of which is incorporated herein by reference; this application is also a Continuation-In-Part Application of U.S. patent application Ser. No. 10/803,010, filed Mar. 17, 2004, now U.S. Pat. No. 7,133,054, entitled "Methods and Apparatus For Navigating an Image" the entire disclosure of which is incorporated herein by reference.

BACKGROUND OF THE INVENTION

Recently, image compression standards such as JPEG2000/JPIP (See e.g. David Taubman's implementation of Kakadu, available on the Kakadu software web site: www.kakadusoftware.com) have been introduced to meet a demanding engineering goal: to enable very large images (i.e. giga-pixels in size) to be delivered incrementally or selectively from a server to a client over a low-bandwidth communication channel. When such images are being viewed at full resolution, only a limited region can fit on a client's graphical display at any given time; the new standards are geared toward selectively accessing such regions and only sending across the communication channel data that is relevant to the region. If this "region of interest" or ROI changes continuously, then a continuous dialogue between a client and server over a low-bandwidth channel can continue to keep the client's representation of the area inside the ROI accurate. Prior technologies are typically limited to the incremental and selective transmission of discretely sampled images. The present invention extends this representation and transmission model to include vector data, hyperlinks, and other spatially localized features.

SUMMARY OF THE INVENTION

One or more embodiments of the present invention relate to an extension of these selectively de-compressible image compression and transmission technologies to geospatial or schematic data. The one or more embodiments combine and extend methods described in the following documents, which are incorporated into this application: (1) "Method for Spatially Encoding Large Texts, Metadata, and Other Coherently Accessed Non-Image Data"; (2) "Methods And Apparatus For Navigating An Image"; (3) "System and Method For The Efficient, Dynamic And Continuous Display Of MultiResolution Visual Data"; (4) "System and Method For Foveated, Seamless, Progressive Rendering In A Zooming User Interface"; and (5) "System and Method for Multiple Node Display".

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

According to one aspect, the invention provides a method of transmitting information indicative of an image comprising transmitting one or more nodes of information as a first image, transmitting a second image including information indicative of vectors defining characteristics to be utilized for display at predetermined locations in the first image, and transmitting a third image comprising a mapping between the first and second images such that a receiver of the first and second images can correlate the first and second images to utilize the vectors at the predetermined locations. Preferably, the first image is a map and the second image is a set of vectors defining visual data that is only displayed at predetermined levels of detail. Preferably, the first image is a map. Preferably, the second image includes hyperlinks. Preferably, the first image is a map, and the second image includes a set of vectors and wherein plural ones of the vectors are located at locations corresponding to locations on the first image wherein the vectors are to be applied, and plural ones of the vectors are located at locations on the second image which do not correspond to the locations on the first image wherein the vectors are to be applied. Preferably, the method further comprises utilizing an efficient packing algorithm to construct the second image to decrease an amount of space between a location on the second image at which one or more vectors appear, and a location on the first image where the one or more vectors are to be applied. Preferably, the vectors include information to launch a node or sub-node.

According to another aspect, the invention provides a method of rendering an image comprising receiving a first, second, and third set of data from a remote computer, the first data set being representative of an image, the second being representative of vectors defining characteristics of the image at prescribed locations, and the third serving to prescribe the locations. Preferably, the prescribed locations are street locations on a map. Preferably, the vectors represent sub-nodes and include information indicative of under what conditions the sub-nodes should launch. Preferably, the vectors include hyperlinks to at least one of the group consisting of: external content, such as advertising materials, and/or embedded visual content. Preferably, the vectors include hyperlinks to advertising materials. Preferably, the vectors include information specifying a rendering method for portions of an image at predetermined locations in the image.

According to another aspect, the invention provides a method, comprising: providing a first layer of an image, the first layer including features of the image having locations within the first layer; and providing a second layer of the image, the second layer including data blocks corresponding to respective ones of the features; each data block being in a location in the second layer substantially corresponding to a location in the first layer of the feature corresponding to each data block, wherein a size and shape of the second layer substantially correspond to a size and shape of the first layer. Preferably, each data block describes at least one characteristic of the feature corresponding to each data block. Preferably, the method further comprises providing a third layer of the image, the third layer including pointers, each pointer corresponding to a respective one of the features and a respective one of the data blocks. Preferably, each pointer indicates the location of each pointer's corresponding data block with respect to each pointer's location. Preferably, the describing comprises providing text data for at least one feature. Preferably, the describing comprises providing a graphical illustration of at least one feature. Preferably, the describing comprises providing geometric data indicative of at least one feature. Preferably, the describing comprises providing two-dimensional or three-dimensional shape or contour information for at least one feature. Preferably, the describing comprises providing color information for at least one feature. Preferably, the describing comprises providing advertising or hyperlinking information relating to at least one feature. Preferably, the describing comprises providing at least one link to an external web site relating to at least one feature. Preferably, the describing comprises providing embedded visual content relating to at least one feature. Preferably, the describing comprises providing advertising information relating to at least one feature. Preferably, the describing comprises: providing schematic detail of a road segment. Preferably, the describing comprises: providing schematic detail for at least one of the group consisting of: at least one road, at least one park, a topography of a region, a hydrography of a body of water, at least one building, at least one public restroom, at least one wireless fidelity station, at least one power line, and at least one stadium.

According to yet another aspect, the invention provides an apparatus including a processing unit operating under the control of one or more software programs that are operable to cause the processing unit to execute actions, including: providing a first layer of an image, the first layer including features of the image having locations within the first layer; and providing a second layer of the image, the second layer including data blocks corresponding to respective ones of the features; each data block being in a location in the second layer substantially corresponding to a location in the first layer of the feature corresponding to each data block, wherein a size and shape of the second layer substantially correspond to a size and shape of the first layer.

According to yet another aspect, the invention provides a storage medium containing one or more software programs that are operable to cause a processing unit to execute actions, including: providing a first layer of an image, the first layer including features of the image having locations within the first layer; and providing a second layer of the image, the second layer including data blocks corresponding to respective ones of the features; each data block being in a location in the second layer substantially corresponding to a location in the first layer of the feature corresponding to each data block, wherein a size and shape of the second layer substantially correspond to a size and shape of the first layer.

According to another aspect, the invention provides a method, comprising: providing a first layer of an image, the first layer including features of the image having locations within the first layer; providing a second layer of the image, the second layer including data blocks corresponding to and describing respective ones of the features, each data block being in a location in the second layer at least substantially corresponding to a location in the first layer of the feature corresponding to each data block; and providing a third layer of the image, the third layer including pointers having locations in the third layer, each pointer corresponding to a respective one of the features and a respective one of the data blocks, the location of each pointer in the third layer at least substantially corresponding to the location in the first layer of the feature corresponding to each pointer. Preferably, the second layer and the third layer each have a size and shape corresponding to a size and a shape of the first layer. Preferably, the method further comprises: forming a map image from a combination of the first layer, the second layer, and the third layer.

Preferably, the method further comprises: flattening data in the map image. Preferably, each pointer indicates the location of each pointer's corresponding data block with respect to each pointer's location. Preferably, the indicating comprises identifying an offset in two dimensions. Preferably, each dimension of the offset is expressed in units corresponding to an integral number of pixels, e.g. 2 or 4. Preferably, the indicating comprises identifying an offset as a one-dimensional distance along a Hilbert curve. Preferably, the offset along the one-dimensional curve is expressed in units of pixels. Preferably, the offset along the one-dimensional curve is expressed in units corresponding to an integral number of pixels. Preferably, the offset along the one-dimensional curve is expressed in units corresponding to integral multiples of pixels. Preferably, placing each data block comprises: locating each data block employing a packing algorithm to achieve a maximum proximity of each data block to a target location for each data block in the second layer, the target location in the second layer corresponding to the location in the first layer of the feature corresponding to each data block. Preferably, the packing algorithm ensures that no two data blocks in the second layer overlap each other.

Preferably, the maximum proximity is determined based on a shortest straight-line distance between each data block's location and the target location for each data block. Preferably, the maximum proximity is determined based on a sum of absolute values of offsets in each of two dimensions between each data block's location and the target location for each data block. Preferably, the maximum proximity is determined based on a minimum Hilbert curve length between each data block's location and the target location for each data block.

According to another aspect, the invention provides a storage medium containing one or more software programs that are operable to cause a processing unit to execute actions, comprising: providing a first layer of an image, the first layer including features of the image having locations within the first layer; providing a second layer of the image, the second layer including data blocks corresponding to and describing respective ones of the features, each data block being in a location in the second layer at least substantially corresponding to a location in the first layer of the feature corresponding to each data block; and providing a third layer of the image, the third layer including pointers having locations in the third layer, each pointer corresponding to a respective one of the features and a respective one of the data blocks, the location of each pointer in the third layer at least substantially corresponding to the location in the first layer of the feature corresponding to each pointer.

According to another aspect, the invention provides an apparatus including a processing unit operating under the control of one or more software programs that are operable to cause the processing unit to execute actions, comprising: providing a first layer of an image, the first layer including features of the image having locations within the first layer; providing a second layer of the image, the second layer including data blocks corresponding to and describing respective ones of the features, each data block being in a location in the second layer at least substantially corresponding to a location in the first layer of the feature corresponding to each data block; and providing a third layer of the image, the third layer including pointers having locations in the third layer, each pointer corresponding to a respective one of the features and a respective one of the data blocks, the location of each pointer in the third layer at least substantially corresponding to the location in the first layer of the feature corresponding to each pointer.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 5B is an image of binary 8-bit data taken from a dense region of roadmap data image of the Virgin Islands after the flattening of such data in accordance with one or more embodiments of the present invention;

FIG. 6 illustrates a first-order Hilbert curve for mapping a two-dimensional pointer vector onto a one-dimensional distance, d, along the Hilbert curve, in accordance with one or more embodiments of the present invention;

FIG. 7 illustrates a second-order Hilbert curve for mapping a two-dimensional pointer vector onto a one-dimensional distance, d, along the Hilbert curve, in accordance with one or more embodiments of the present invention;

FIG. 8 illustrates a third-order Hilbert curve for mapping a two-dimensional pointer vector onto a one-dimensional distance, d, along the Hilbert curve, in accordance with one or more embodiments of the present invention;

FIG. 9 illustrates a fourth-order Hilbert curve for mapping a two-dimensional pointer vector onto a one-dimensional distance, d, along the Hilbert curve, in accordance with one or more embodiments of the present invention;

FIG. 10 illustrates a fifth-order Hilbert curve for mapping a two-dimensional pointer vector onto a one-dimensional distance, d, along the Hilbert curve, in accordance with one or more embodiments of the present invention;

FIG. 11 depicts an image of one of the U.S. Virgin Islands which incorporates 4-pixel by 4-pixel size data blocks for use in accordance with one or more embodiments of the present invention;

DETAILED DESCRIPTION OF THE PREFERRED EMBODIMENTS

Figure 1:
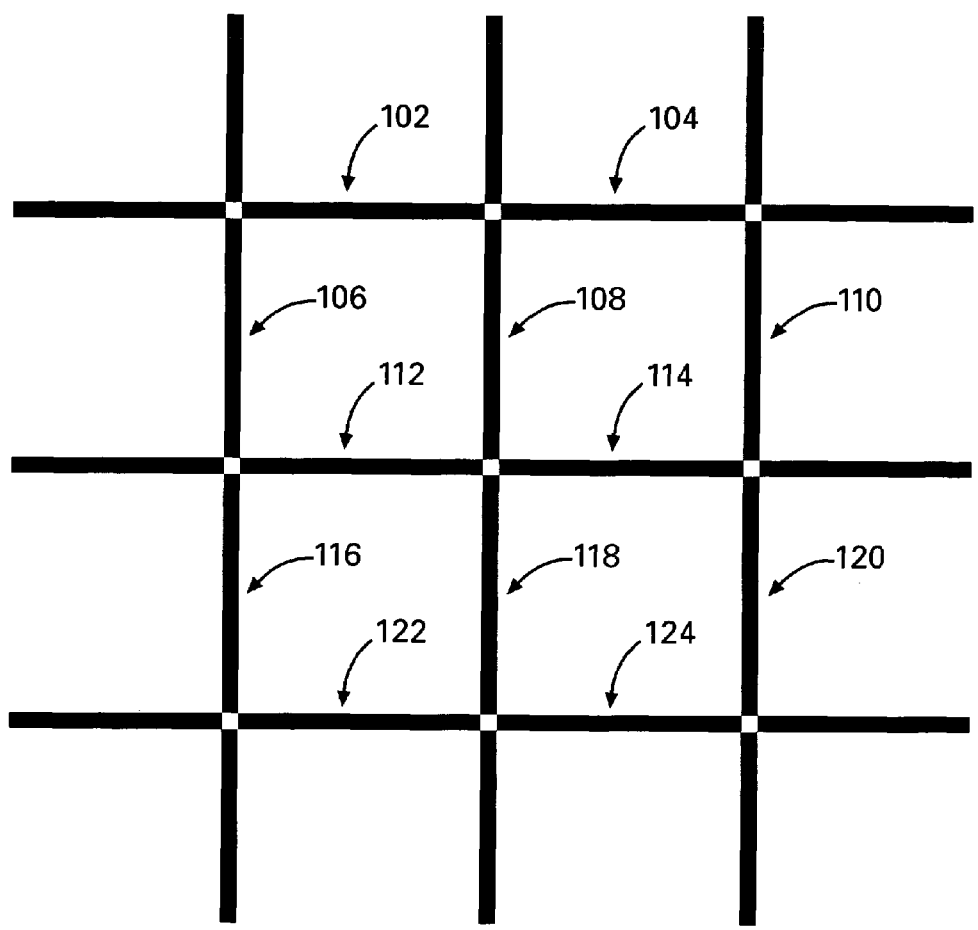
FIG. 1 illustrates a prerendered layer of a roadmap image including a plurality of features suitable for description in data blocks in accordance with one or more embodiments of the present invention.

It is noted that the various aspects of the present invention that will be discussed below may be applied in contexts other than encoding and/or serving map data. Indeed, the extent of images and implementations for which the present invention may be employed are too numerous to list in their entirety. For example, the features of the present invention may be used to encode and/or transmit images of the human anatomy, complex topographies, engineering diagrams such as wiring diagrams or blueprints, gene ontologies, etc. It has been found, however, that the invention has particular applicability to encoding and/or serving images in which the elements thereof are of varying levels of detail or coarseness. Therefore, for the purposes of brevity and clarity, the various aspects of the present invention will be discussed in connection with a specific example, namely, encoding and/or serving of images of a map.

In (2), the concept of continuous multi-scale roadmap rendering was introduced. The basis for one or more embodiments of the invention of (2) is a pre-rendered "stack" of images of a roadmap or other vector-based diagram at different resolutions, in which categories of visual elements (e.g. classes of roads, including national highway, state highway, and local road) are rendered with different visual weights at different resolutions.

During client/server interaction, corresponding areas of more than one of these images can be downloaded, and the client's display can show a blended combination of these areas. Blending coefficients and a choice of image resolutions can be blended depending upon the zoom scale. The net result is that a user on the client side can navigate through a large map (e.g. all roads in the United States), zooming and panning continuously, without experiencing any visual discontinuities, such as categories of roads appearing or disappearing as the zoom scale is changed.

Rather, at every scale, the most relevant categories can be accentuated. For example, when zoomed out to view the entire country, the largest highways can be strongly weighted, making them stand out clearly, while at the state level, secondary highways can also weighted strongly enough to be clearly visible. When the user zooms in to the point where the most detailed pre-rendered image is being used, all roads are clearly visible, and in the preferred embodiment for geospatial data, all elements are preferably shown at close to their physically correct scale. A maximum reasonable resolution for these most detailed pre-rendered images may be about 15 meters/pixel. However, it is desirable from the user's standpoint to be able to zoom in farther.

However, pre-rendering at still higher levels of detail is not desirable for several reasons: first, because the file sizes on the server side become prohibitively large (a single Universal Transverse Mercator zone image at 15 meters/pixel may already be in the gigapixel range); second, because a pre-rendered image is an inefficient representation for the kind of very sparse black-and-white data normally associated with high-resolution roadmap rendering; and third, because the client may require the "real" vector data for performing computational tasks beyond a static visual presentation.

For example, a route guidance system may highlight a road or change its color as displayed to a user on a monitor or in print media. This can be done on the client side only if the client has access to vector data, as opposed to a pre-rendered image alone. Vector data may also include street names, addresses, and other information which the client preferably has the flexibility to lay out and render selectively. Pre-rendering street name labels into the map image stack is undesirable, as these labels are preferably drawn in different places and are preferably provided with different sizes depending on the precise location and scale of the client view. Different label renditions should not blend into one another as the user zooms. Pre-rendering such data would also eliminate any flexibility with regard to font.

To summarize, vector data (where we use the term generically to refer both to geometric and other information, such as place names) is both beneficial to the client in its own right, and a more efficient representation of the information than pre-rendered imagery, when the desired rendering resolution is high. However, if a large area is to be rendered at low resolution, the complete vector data may become prohibitively large and complex, making the pre-rendered image the more efficient representation. Even at low resolution, however, some subset of the vector data is beneficial, such as the names of major highways. This subset of the vector data may be included in a low resolution data layer associated with the low resolution pre-rendered layer, with more detailed vector data available in data layers associated with higher resolution pre-rendered layers.

One or more embodiments of the present invention extend the methods introduced in (1) to allow spatial vector data to be encoded and transmitted selectively and incrementally to the client, possibly in conjunction with the pre-rendered imagery of (2). In the prior art, this would be accomplished using a geospatial database. The database would need to include all relevant vector data, indexed spatially. Such databases present many implementation challenges. In one or more embodiments of the present invention, instead of using conventional databases, we use spatially addressable images, such as those supported by JPEG2000/JPIP, to encode and serve the vector data.

Multiple Image Map Data Representation

In one or more embodiments, three images or channels are used for representing the map data, each with 8-bit depth. The prerendered layer is a preferably pre-computed literal rendition of the roadmap, as per (2). The pointer layer preferably includes 2*2 pixel blocks which are preferably located in locations within the pointer layer that correspond closely, and sometimes identically, to the locations, within the pre-rendered layer, of the respective features that the pointers correspond to. And the data layer preferably consists of n*m pixel blocks centered on or positioned near the 2*2 pointers which refer to them. The prerendered layer may also be in 24-bit color, or in any other color space or bit depth.

It is noted that that the prerendered layer, the pointer layer, and the data layer are in essence two-dimensional memory spaces for storing various quantities of binary data. These three layers preferably correspond to a common two-dimensional image region which is the subject of a roadmap or other two-dimensional image representation to a client. As used herein, the terms "size" and "shape" of a layer generally correspond to the size and shape, respectively, of the two-dimensional image which the data in that layer relates to.

Preferably, the prerendered layer, the pointer layer, and the data layer forming a particular map image, for instance, have "sizes" and "shapes" in the two-dimensional image (that is formed from these three layers) that are at least very close to, or possibly identical to, one another. This is preferably true however the stored data for the three layers are distributed within a physical memory of a data processing system.

In one embodiment, the pertinent "features" in the prerendered layer may be road segments. In a map having 10 road segments, pointer 1 in the pointer layer would correspond to road segment 1 in the prerendered layer and to data block 1 in the data layer. Pointer 2 would correspond to road segment 2 and to data block 2, and so forth, with pointer "n," in each case corresponding to road segment "n" and to data block "n" for n=1 to n=10. Moreover, pointer 1 is preferably in a location within the pointer layer that corresponds closely, and perhaps identically, to the location of road segment 1 (or more generally "feature 1") within the pre-rendered layer.

The various map layers (pre-rendered, pointer, and data) can be thought of as being superimposed on each other from the standpoint of readiness of association of an entry (feature, pointer, or data block) in any layer to the corresponding entry (feature, pointer, or data block) in any other layer of these three layers. Thus, the size and shape of the three map layers preferably correspond closely to one another to make the desired associations of entries in the respective map layers as seamless as possible within a data processing system configured to access any of the layers and any of the entries in the layers, as needed. It will be appreciated that while the discussion herein is primarily directed to maps formed from three layers of data, the present invention could be practiced while using fewer or more than three layers of data, and all such variations are intended be within the scope of the present invention.

Figure 2:
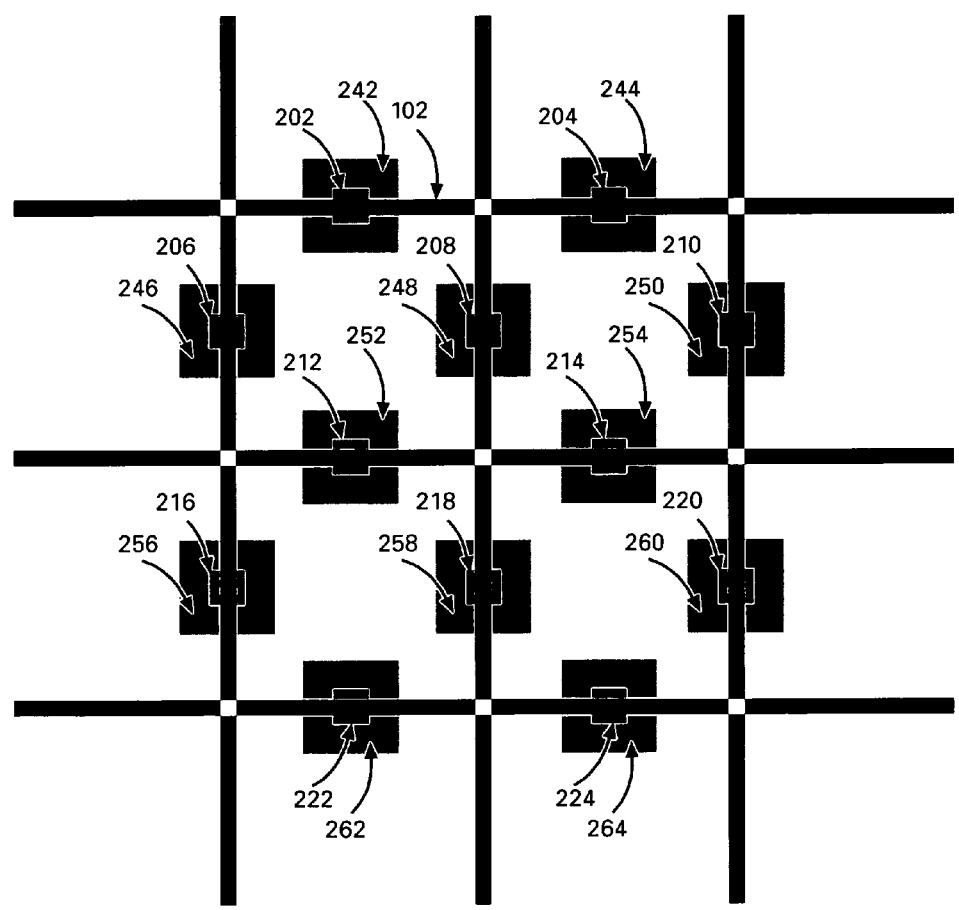
FIG. 2 illustrates the roadmap of FIG. 1 and the pointers and data blocks corresponding to the respective road segments in a region having a low concentration of road segments in accordance with one or more embodiments of the present invention.
Figure 3:
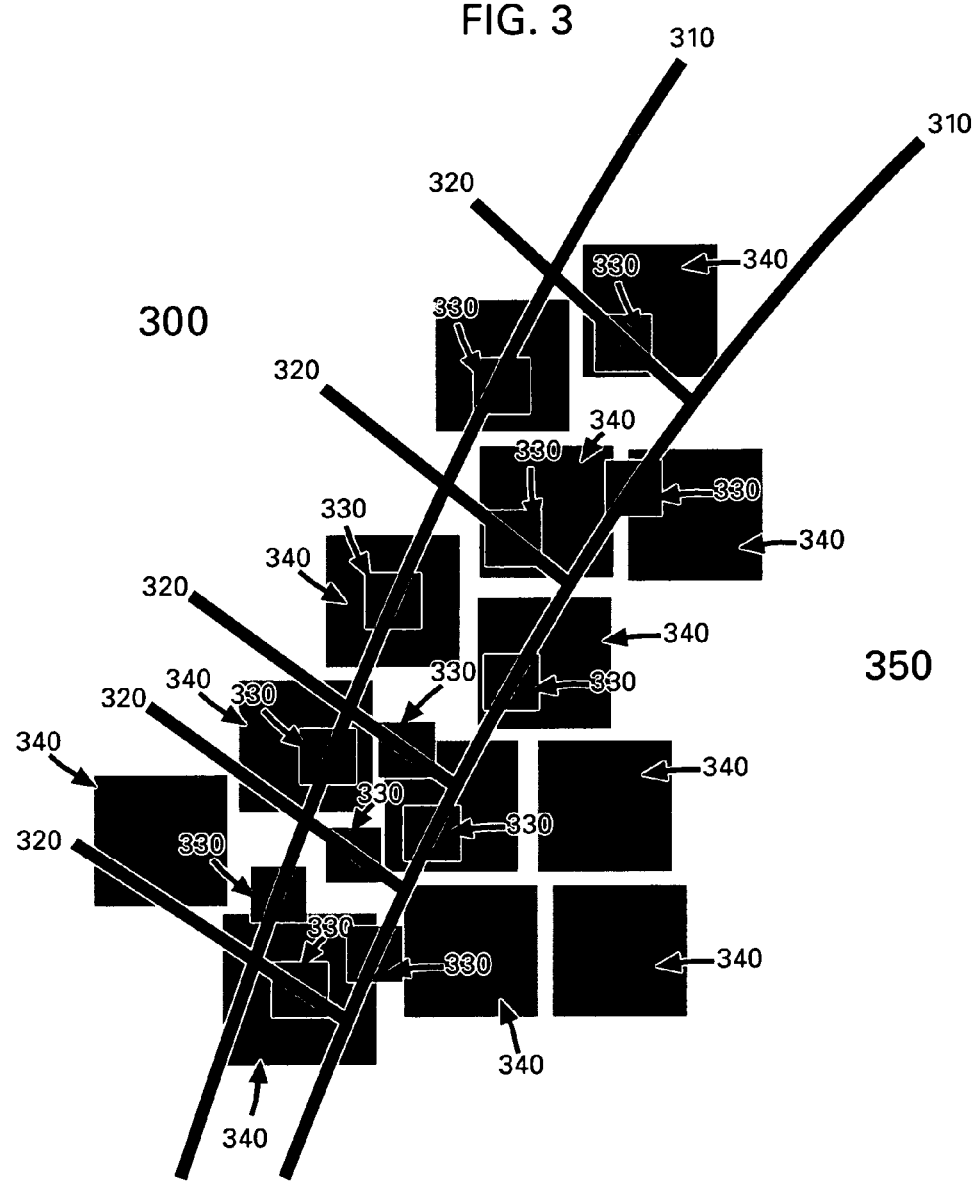
FIG. 3 illustrates a concentrated set of road segments belonging to a plurality of roads with a main road as well as pointers and data blocks corresponding to the road segments in a region having a high concentration of intersections in accordance with one or more embodiments of the present invention.

Because the three map layers are preferably of equal size and in registration with each other, they can be overlaid in different colors (red, green, blue on a computer display, or cyan, magenta, yellow for print media) to produce a single color image. FIGS. 1-3 may be displayed in color (either on an electronic display or on print media), and may be stored on the server side as a single color JPEG2000. However, for the sake of simplicity, FIGS. 1-3 are presented in black and white in this application. Preferably, only the prerendered layer would actually be visible in this form on the client's display.

FIG. 1 illustrates a prerendered layer of a roadmap including a plurality of features numbered 102 through 124. For the sake of simplicity, in FIG. 1, the features shown are all road segments. However, features may include many other entities such as sports arenas, parks, large buildings and so forth. The region shown in FIG. 1 is included for illustrative purposes and does not correspond to any real-world city or street layout.

FIG. 2 illustrates the roadmap of FIG. 1 as well as the pointers and data blocks corresponding to the respective road segments in a region having a low concentration of road segments in accordance with one or more embodiments of the present invention. Road segment 102 is shown in FIG. 2 and the other road segments from FIG. 1 are reproduced in FIG. 2. However, due to space limitations, the reference numerals for the other eleven road segments (104-124) are not shown in FIG. 2. Throughout FIGS. 2 and 3, pointers are shown as dark grey blocks, and data blocks are shown as larger light grey blocks.

Because FIG. 2 illustrates a region having a relatively low concentration of road segments per unit area, there is no difficulty locating pointers (202, 204, 206, 208, 210, 212, 214, 216, 218, 220, 222 and 224) at locations in the second layer (pointer layer) of map 200 corresponding closely, and possibly identically, to the locations in the first layer (prerendered layer) of map 200 of the respective features to which the pointers correspond. Similarly, data blocks (242, 244, 246, 248, 250, 252, 254, 256, 258, 260, 262 and 264) can be placed in locations within the third layer (data layer) of map 200 that correspond reasonably closely to the locations within the prerendered layer of map 200 of the respective features to which the data blocks correspond.

FIG. 3 illustrates a concentrated set of road segments of a plurality of minor roads 320 and a smaller number of main roads 310 as well as pointers and data blocks corresponding to their respective road segments in a region having a high concentration of road segments in accordance with one or more embodiments of the present invention. Reference numeral 330 refers to all of the pointers, and reference numeral 340 refers to all of the data blocks.

In the exemplary region of FIG. 3, the concentration of features is too high to enable all of the pointers or all of the data blocks to be located in locations within their respective layers that correspond exactly to the locations of the features in layer one that they correspond to. The degree of offset for the pointer locations may be minor or significant depending upon the degree of crowding. However, the concentration of road segments in FIG. 3 precludes placing the data blocks in locations in layer three closely corresponding to the locations of the respective features within layer one that the data blocks correspond to.

Accordingly, data blocks 340 are distributed as close as possible to their corresponding pointers, making use of a nearby empty area 350 which is beneficially devoid of features, thus allowing the data blocks 340 to overflow into empty area 350. Empty area 350 may be any type of area that does not have a significant concentration of features having associated pointers and data blocks, such as, for example, a body of water or a farm. A packing algorithm may be employed to efficiently place data blocks 340 within map 300. This type of algorithm is discussed later in this application, and the discussion thereof is therefore not repeated in this section.

If the user navigates to the view of the map 100 shown in FIG. 1, the client can request from the server the relevant portions of all three image layers, as shown. The prerendered layer is generally the only one of the three image layers that displays image components representing the physical layout of a geographical area. The other two image layers preferably specify pointers and data blocks corresponding to features in the prerendered layer.

In one embodiment, the pointer image consists of 2×2 pixel blocks aligned on a 2×2 pixel grid, each of which specifies an (x,y) vector offset (with the x and y components of the vector each comprising a 16-bit integer, hence two pixels each) from its own location to the beginning (top left corner) of a corresponding data block in the data layer.

In this embodiment, the corresponding data block, in turn, can begin with two 16-bit values (four pixels) specifying the data block width and height. Preferably, the width is specified first, and is constrained to have a magnitude of at least 2 pixels, hence avoiding ambiguities in reading the width and height. The remainder of the data block can be treated as binary data which may contain any combination of vectors, text, or other information. In the examples of FIGS. 2-3, data blocks may contain street-map information including street names, address ranges, and vector representations.

Compression:

In this section, the advantages of one or more embodiments of the above-discussed pointer layer and data layer combination over existing approaches are presented. One existing solution involves sending requests to a spatial database for all relevant textual/vector information within a window of interest. The server then replies with a certain volume of text. Existing spatial database systems send back the information substantially as plain text.

In one or more embodiments of the present invention, however, wavelet compression can be applied, thereby enabling the server to satisfy the data request while sending a much smaller quantity of data than would existing systems. Areas with no data storage that are located between data-storage areas on the data and pointer layers create very little waste, as they would if the image were being transmitted in uncompressed in raster order, because these areas have zero complexity and can be compressed into a very small number of bits in the wavelet representation.

Exploitation of Spatial Coherence:

Typical browsing patterns involve gradual zooming and panning. Multi-resolution streaming image browsing technologies are designed to work well in this context. Complete information can be transmitted for the window of interest, and partial information can be transmitted for areas immediately surrounding the window of interest. Upon panning or other movement, preferably only the relevant new information is transmitted (the "delta"). All of this can be done in a very efficient manner. An especially large data block, for example, may be partially transmitted well before the window of interest intersects the data block's anchor point.

Performance:

In one or more embodiments of the present invention, the pointer layer shows how distant a data block is from the pointer it corresponds to. We recall that in rural areas, the data blocks can be centered directly on the pointer positions. In this case, all data would be perfectly local. In urban areas, however, data begins to "crowd", and data blocks may be in positions offset from the respective pointers (in the pointer image) and the respective features (in the prerendered image) that the data blocks correspond to.

In one or more embodiments of the present invention, when a map is generated, an upper limit can be imposed on the maximum displacement of a data block from the feature to which it corresponds in the prerendered image. This in turn limits the maximum area, and hence the maximum complexity, of a portion of a data layer relevant to a window of interest of a given size in the prerendered image. For example, if the maximum displacement is 32 pixels, then the window in the data image need only be 32 pixels bigger on each side than the window of interest in the prerendered image.

If the data density increases above the point where the packing is possible, one can always increase the resolution, for example, from 15 meters/pixel to 12 meters/pixel. This gives the data more "breathing space". It is noted that data of different kinds can also be distributed among different levels of detail. Thus, for example, excessive crowding of the data at a resolution of 40 meters/pixel implies that some class of that data might be better stored at the 30 meter/pixel level.

Crowding may be visible in the data layer and in the pointer layer. The appropriate resolutions for different classes of data may vary over space, so that for example small-street vector data might be encodable at 30 meters/pixel in rural areas but only at 12 meters/pixel in urban areas. In short, the pointer and data images make data crowding easy to detect and correct, either visually or using data-processing algorithms. The resulting hierarchy of data images can help ensure high-performance vector browsing even in a low-bandwidth setting, since the amount of data needed for any given view can be controlled so as to not exceed an upper bound. This kind of upper bound is extremely difficult to enforce, or even to define, in existing geospatial databases.

Implementation Convenience:

One or more aspects of the present invention concern mapping the geospatial database problem onto the remote image browsing problem. A great deal of engineering has gone into making remote image browsing work efficiently. In addition to basic compression technology, this includes optimization of caching, bandwidth management, memory usage for both the client and the server, and file representation on the server side. This technology is mature and available in a number of implementations, as contrasted with conventional geospatial database technology.

Accordingly, one or more embodiments of the present invention contemplate bringing about efficient cooperation between a suitably arranged geospatial database and remote image browsing technology that interacts with the geospatial database. Further, in one or more embodiments of the present invention, only a single system need then be used for both image and data browsing, with only a simple adapter for the data on the client side. The foregoing is preferable to having two quasi-independent complex systems, one for image browsing and another for data browsing.

Alternative Method for Representing Pointers

In one or more alternative embodiments of the present invention, we consider the Hilbert curve, sometimes also called the Hilbert-Peano curve. The Hilbert curve belongs to a family of recursively defined curves known as space-filling curves (see http://mathworld.wolfram.com /HilbertCurve-.html, or for the original reference, Hilbert, D. "Über die stetige Abbildung einer Linie auf ein Flachenstück." Math. Ann. 38, 459-460, 1891, which is incorporated by reference herein.). Hilbert curves of order 1, 2, 3, 4 and 5 are illustrated in FIGS. 6, 7, 8, 9, and 10, respectively.

As is evident in the high-order limit, the one-dimensional curve fills the entire unit square (formally, becomes dense in the unit square). The $n^{th}$ order curves visit $4^n$ points on the unit square. For the first order case (for $4^1$), these points are the corners of the square. For the purposes related to the present invention, it is preferred to have the $n^{th}$ order curve visit all of the integer coordinates in the square $(0,0)$-$(2^n-1, 2^n-1)$. Using bit manipulation, there are known rapid algorithms for inter-converting between path length on the $n^{th}$ order Hilbert curve and (x,y) coordinates (see Warren, Henry S. Jr., Hacker's Delight, Addison-Wesley 2003, chapter 14), which is hereby incorporated herein by reference. For example, for the second order curve, this inter-conversion would map from the left column to the right or vice versa in the following table:

TABLE 1

| | |
|---|---|
| 0 | 0, 0 |
| 1 | 1, 0 |
| 2 | 1, 1 |
| 3 | 0, 1 |
| 4 | 0, 2 |
| 5 | 0, 3 |
| 6 | 1, 3 |
| 7 | 1, 2 |
| 8 | 2, 2 |
| 9 | 2, 3 |
| 10 | 3, 3 |
| 11 | 3, 2 |
| 12 | 3, 1 |
| 13 | 2, 1 |
| 14 | 2, 0 |
| 15 | 3, 0 |

The Hilbert curve is relevant to the problem of encoding the pointer image because it provides a convenient way of encoding a two-dimensional vector (having components x and y) as a single number d, while preserving the "neighborhood relationship" fairly well. The neighborhood relationship means that as the vector position changes slowly, d tends to also change slowly, since, generally, points whose "d" values are close together are also close in two-dimensional space. However, this relationship does not always hold. For example, in the order-2 case, when moving from (1,0) to (2,0), the path distance "d" goes from 1 to 14. It is not possible to fill 2D space with a 1D curve and always preserve the neighborhood relationship.

Representing the path distance d of the $n^{th}$ order Hilbert curve requires 2*n (2 multiplied by n) bits. When employing a two-dimensional representation, the x and y coordinates each require n bits to represent a point located on the path distance d. Hence "Hilbert coding" a vector re-packages the pair of numbers (x,y) as a single number d, but both the input (x,y) and the output d use the same number of bits, 2n. Small (x,y) vectors encode to small values of d. In fact, it can be observed that the $n^{th}$ order Hilbert curve is nothing more than the lower-left quarter of the $(n+1)^{th}$ order curve.

Hence, the value of every pixel in an 8-bit image can be taken to be a path distance on the 4th order Hilbert curve, thus encoding a vector in the range (0,0)-(15,15), i.e. anywhere on a 16*16 grid. Instead of packing 4 bits of x in the low-order nibble and 4 bits of y in the high-order nibble, the Hilbert coded pixels will have a value which is less than 16 if x and y are both less than 4, and a value less than 4 if x and y are both less than 2. Because the data packing algorithm preferably packs data blocks as close as possible to the anchor point (where the pointer will be inserted), vectors with small values are common. Moreover, if these vectors are Hilbert-coded, this will translate into small pixel values in the pointer image and hence better image compression performance.

In one embodiment, we make use of 16-bit images or 24-bit images, which can encode (x,y) vectors on 256*256 or 4096*4096 grids, respectively. The value 256 equals $2^8$, and the value 4096 equals $2^{12}$.

In one embodiment, the Hilbert coding algorithm is modified to accommodate signed vectors, where x and y values range over both positive and negative numbers. The modification involves specifying two extra bits along with the path distance d, identifying the vector quadrant. These two bits are sign bits for x and y. The absolute values of x and y are then Hilbert coded as usual. (To avoid double coverage, x=0 and y=0 belong to the positive quadrant, and absolute values for negative x or y are computed as −1−x or −1−y.) In this embodiment, the sign bits are assigned to the two lowest-order bit positions of the output value, so that the numerical ranges of coded vectors in each of the quadrants are approximately equal. Hence, for the 16-bit image example, vectors with x and y values between −128 and +127 inclusive can be coded using a 7th order Hilbert curve for each quadrant. Vectors with x and y between −64 and +63 are assigned pixel values that can be represented with 14 bits, where $2^{14}=16384$. If x and y are between −8 and 7, then the values are less than $2^8=256$.

Packing Algorithm

In one or more embodiments, the pointer and data layers are precomputed, just as the prerendered layer is. Precomputation for the pointer and data layers consists of encoding all of the relevant vector data into data blocks, and packing both the pointers and data blocks as efficiently as possible into their respective layers. In rural or sparse suburban areas (see FIG. 2), features tend to be well separated, resulting in large empty areas in the pointer and data images. Where pointers do occur, they preferably fall precisely on the feature to which they refer, and their corresponding data blocks are in turn often centered precisely on the pointer. In dense urban areas, however (see FIG. 3), features are often too close together for the pointers and data blocks to fit into locations closely corresponding to the locations of their corresponding features in the prerendered layer. It is therefore helpful to use a rectangle packing algorithm to attempt to place pointers and data blocks as close to their desired positions as possible without any overlaps.

The results are evident in FIG. 3. Empty area 350 is filled with data blocks 340 corresponding to features present along road 310 at intersections with plurality of roads 320. Because urban areas are typically surrounded by sparser areas (suburbs, mountains, or bodies of water), it is possible to place urban data blocks somewhere on the map, in reasonable proximity to the urban areas whose features they correspond to.

In general, even within a densely settled city there are enough empty spaces that this "spillover" is not overly severe. In general, the higher the rate of spillover is, the less well-localized the map vector data becomes. Spillover generally decreases drastically as the resolution of the data layer image is increased. It is beneficial to find a resolution at which efficiency and non-locality are appropriately balanced. In North America, 15 m/pixel is generally a good choice. The resolution of 15 m/pixel is "overkill" in rural areas, but near cities, this choice of resolution tends to limit spillover.

Efficient rectangle packing is a computationally difficult problem. However, there are numerous approximate algorithms in the computational geometry literature for solving it, and the present invention is not limited to any particular one of these. Otherwise stated, one or more of the rectangle-packing algorithms, described in the computational geometry literature and known to those of skill in the art, may be employed in conjunction with one or more embodiments of the present invention to place data blocks within the data layer.

A preferred algorithm which has already been used in conjunction with one or more embodiments of the present invention involves a hierarchical "rectangle tree", which enables conducting the following operations rapidly: testing whether a given rectangle intersects any other rectangle already in the tree; inserting a non-overlapping rectangle; and finding the complete set of "empty corners" (i.e. corners abutting already-inserted rectangles that border on empty space) in a ring of radius $r_0 <= r < r_1$ around a target point p.

A "greedy algorithm" is used to insert a new rectangle as close as possible to a target point and then proceeds as follows:

1) Attempt to insert the rectangle centered on the target point. If this succeeds, algorithm ends.
2) Otherwise, define radius r0 to be half the minimum of the length or width of the rectangle, and $r_1 = r_0 * 2$.
3) Find all "empty corners" between $r_0$ and $r_1$, and sort by increasing radius.
4) Attempt to place the rectangle at each of these corners in sequence, and on success, algorithm ends.

If none of the attempted insertions succeeds, set $r_0$ to r1, set r1 to $2*r_0$, and go to step 3.

In a preferred embodiment, this algorithm ultimately succeeds in placing a rectangle provided that, somewhere in the image, an empty space exists which meets or exceeds the dimensions of the rectangle to be placed. This algorithm is "greedy" in the sense that it places a single rectangle at a time. The greedy algorithm does not attempt to solve the wholistic problem of packing n rectangles as efficiently as possible. A wholistic algorithm includes defining an explicit measure of packing efficiency, specifying the desired tradeoff between minimizing wasted space and minimizing distance between rectangles and their "target points". The greedy algorithm is less optimal, but does not require explicitly specifying this tradeoff, as is clear from the algorithm description above.

Figure 4:
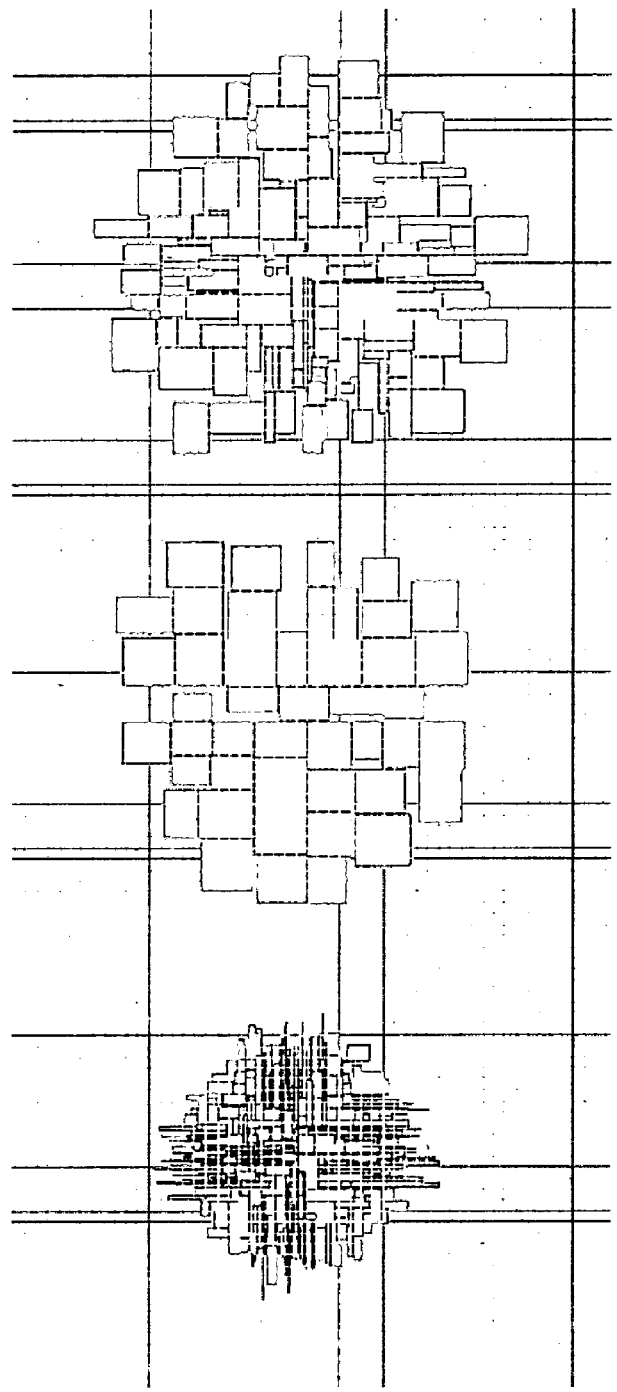
FIG. 4 illustrates test output of a greedy rectangle packing algorithm for three cases in accordance with one or more embodiments of the present invention.

FIG. 4 demonstrates the output of the basic packing algorithm for three cases. In each case, the algorithm sequentially places a number of rectangles as near as possible to a common point. This solution to the rectangle packing problem is provided by way of example. In the left-most case, most of the rectangles are small and narrow. The center example of the three, large and at least substantially square rectangles are used. And in the right-most example, a mix of small and large rectangles is employed.

For the greedy packing algorithm not to give placement preference to any specific areas of the map, it is desirable to randomize the order of rectangle insertion. In a preferred embodiment, pointer/data block pairs are thus inserted in random order. Other orderings may further improve packing efficiency in certain circumstances. For example, inserting large blocks before small ones may minimize wasted space.

In a preferred embodiment, pointer data is organized into two-pixel by two-pixel (meaning two pixels along a row and two pixels along a column) units. Thus, with units in pixels, each pointer is preferably 2×2 (the notation being rows× columns). However, in alternative embodiments, the row size and the column size of pointers may vary. In an alternative embodiment, pointers may be represented by a single 24-bit color pixel, using $12^{th}$ order Hilbert coding.

For data blocks, there is freedom in selecting an aspect ratio of the data block: the block area in square pixels is determined by the amount of data which will fit in the block, but this area can fit into rectangles of many different shapes. For example, a 24-byte data block (including 4 bytes of width and height information, and 20 bytes of arbitrary data) can be represented exactly as 1×24, 2×12, 3×8, 4×6, 6×4, 8×3, or 12×2. (24×1 is disqualified, because, in this embodiment, the block width should be at least 2 so that the 2-byte width can be decoded before the block dimensions are known on the client side, as described above.)

The data block can also be represented, with one byte left over, within a 5-pixel by 5-pixel block (or "5×5"). We refer to the set of all factorizations listed above, in addition to the approximate factorization 5×5, as "ceiling factorizations." The specifications for a valid ceiling factorization are that its area meet or exceed the dimensions of the data block in question, and that no row or column be entirely wasted. For example, 7×4 or 3×9 are not preferred ceiling factorizations, as they can be reduced to 6×4 and 3×8, respectively. In the simplest implementation, block dimensions may be selected based only on a ceiling factorization of the data length. In general, "squarer" blocks (such as 4×6) pack better than oblique ones (such as 2×12).

The simplest data-block-sizing algorithm can thus select either 4×6 or 5×5, depending on how it trades off "squareness" against wasted bytes. More sophisticated block size selection algorithms may pick block dimensions adaptively, as part of the search for empty space near the target point. In one embodiment, steps 1 and 4 of the algorithm above are then modified as follows: 1) sort the ceiling factorizations having the needed data length by desirability, with preference for squarer factorizations and possibly a penalty for wasted bytes. 2) Attempt to place rectangles of dimensions given by each ceiling factorization in turn at target point p. 3) If any of these insertions succeeds, the algorithm ends. 4) For each "empty corner" c in turn, attempt to place rectangles of dimensions given by each of the ceiling factorizations in turn at c. On success, algorithm ends.

Further refinements of this algorithm involve specification of a scoring function for insertions, which, as with a wholistic optimization function, trade off wasted space, non-square aspect ratio, and distance from the target point.

Each of the three map layers—the prerendered layer, the pointer layer, and the data layer—is preferably stored as a JPEG2000 or similar spatially-accessible representation. However, the permissible conditions for data compression are different for different ones of the three layers.

Compression for the prerendered road layer need not be lossless, but it is beneficial for it to have reasonable perceptual accuracy when displayed. At 15 m/pixel, we have found 0.5 bit/pixel lossy wavelet compression to be fully adequate. However, in a preferred embodiment, the pointer and data layers are compressed losslessly, as they contain data which the client needs accurate reconstruction of. Lossless compression is not normally very efficient. Typical digital imagery, for example, is not usually compressible losslessly by more than a factor of about two at best. Techniques have been developed (as described in the "Flattening" section below) to achieve much higher lossless compression rates for the data and pointer layers, while still employing standard wavelet-based JPEG2000 compression.

Alternative Packing Method

An alternative embodiment for packing data blocks within the data layer is presented in this section. In a preferred embodiment, an "allocate" function is defined to allocate a given number of bytes (corresponding to pixels). This allocate function preferably differs from the analogous conventional memory allocation function (in C, "malloc") in three ways.

1) While conventional memory allocation functions return a scalar pointer corresponding to the address of the beginning of a contiguous allocated interval in a one-dimensional address space, the pointer returned by our allocate function is a two-dimensional vector, specifying a starting position in the data image.
2) The pixels allocated by the allocate function disclosed herein may not all be contiguous, as are the allocated bytes beginning at the address returned by the function "malloc."
3) The allocate function disclosed herein is passed not only a desired number of pixels to allocate, but also a target position on the data image. The desired number of pixels are allocated as close as possible to the target position, while avoiding any previously allocated pixels.

The "allocate" function described in the "Packing Algorithm" section and the alternative "allocate" function described below share these characteristics. However, the previous "allocate" function always allocates a single rectangle of pixels, while the function described below can allocate space more flexibly.

Desirable Properties for the Data Image:

1) Low data overhead: One or more embodiments of the data image explored to date need some auxiliary data to be encoded. In the preliminary version, this data includes the block dimensions, stored as 16-bit values for width and height. Thus, the overhead was 4 pixels per allocated chunk of data.
2) Minimum wasted space: One or more embodiments of the data image explored so far may waste some pixels. For example, in one embodiment, requesting 26 pixels might have resulted in the allocation of an 8×4 pixel block. Of the 8×4=32 resulting pixels, 4 are overhead, and another 2 are wasted.
3) Good spatial localization: Repeated allocation of sizable chunks of data near the same target position will result in "crowding." It is desirable for the data pixels to be as close to the target as possible.
4) Coherence: It is desirable to keep the pixels of a single chunk as contiguous as possible, both for performance reasons and to reduce the number of incomplete data chunks given a fixed-size window into the data image.

Tradeoffs among these properties must generally be made. For example, although coherence and spatial localization would appear to be similar properties, they are often in conflict. If a long data chunk is allocated near a crowded spot, the nearest contiguous area may be far away, whereas the required number of pixels could be allocated nearby if the data chunk is instead broken up to fill cracks, resulting in better localization but worse coherence.

One or more embodiments of the present invention simplify data packing by setting the fundamental spatial unit of data allocation to be an n*m pixel block, where n and m are small but not less than 2*2, aligned on a grid with spacing n*m. These blocks may thus be considered "superpixels".

A single allocated chunk typically has more than n*m bytes, and the chunk must therefore span multiple blocks. Thus, blocks are preferably chained. The first two pixels of a block preferably comprise a pointer (which may be Hilbert-encoded, as described above), pointing to the next block in the chain. This is in effect a two-dimensional analogue of a singly-linked list. Vectors can be specified in grid units relative to the current block, so that for example, if a block specifies the vector (+1,0), it would mean that the chunk continues in the next block to the right; if a block specifies (−2,−1), it would mean that the chunk continues two blocks to the left and one block up. A (0,0) vector (equivalent to a null pointer) may be used to indicate that the current block is the last in the chain.

Data overhead in this scheme may be high if the block size is very small. For the limiting case of a 2×2 block, two of the four pixels per block serve as pointers to the next block, making the overhead data one half of the total data for the block. There are many compensating factors, however. One is that the packing problem is greatly simplified, resulting in a more optimal solution with less wasted space and better localization.

In one embodiment, the chunk allocation algorithm works by allocating n*m blocks sequentially. For k bytes, ceil ((n*m−2)/k) blocks can be allocated. Allocation of a block can consist of locating the nearest empty block to the target point and marking it as full. After the required number of blocks are allocated, data and next-block pointers are then written to these blocks. "Nearest" may be defined using a variety of measures, but the four choices with useful properties are:

1) Euclidean (L2) norm: This will select the block with the shortest straight-line distance to the target, filling up blocks in concentric rings.
2) Manhattan (L1) norm: This distance measure is the sum of the absolute values of x offset and y offset. While a circle defines the set of points equidistant from a target point in L2, a rectangle defines this set in L1. Thus, blocks will fill up in concentric rectangles when using this measure. The L1 measure makes more sense than L2 for most applications, because windows into the data image are themselves rectangular and because the maximum ranges for two-dimensional pointers are rectangular.
3) Hilbert Curve Norm: This norm is defined using the actual Hilbert curve path length, with the quadrant encoded in the lower two bits as described in the previous section. Minimizing this norm thus directly minimizes pointer magnitudes. Also, unlike the previous two norms, this one is non-degenerate, meaning that the distance from the target point (rounded to the nearest block position) to any other block is unique. In this embodiment, the "nearest" non-allocated block is therefore uniquely defined.
4) Rectangular spiral norm: This distance is similar to the L1 norm, but it breaks the L1 norm's degeneracy by imposing a consistent ordering on the blocks in a rectangular path L1-equidistant from the target. This path can begin and end at an arbitrary point on the rectangle. For convenience, we can specify the low-x, low-y corner, with clockwise progression. This norm has the advantages that, like the Hilbert curve norm, it uniquely defines the "nearest" non-allocated block. Assuming that there are no collisions with pre-existing full blocks, sequential blocks are adjacent, thereby forming an expanding spiral around the target.

Other measures for picking the best (free) next block in a chain during allocation are also possible. In one embodiment, an allocator can take into account not only the distance of each block from the target point, but also the distance of each block from the previous block. The same measure can be used for measuring these two distances. Alternatively, different measures can be used, and these two distances can be added or otherwise combined with a relative weighting factor to give a combined distance. Weighing distance from the previous block heavily in deciding on the position of the next block favors coherence, while weighing absolute distance to the target point heavily favors spatial localization. Hence this scheme allows coherence and localization to be traded off in any manner desired by adjusting a single parameter.

The other important parameter is the block size "n." This discussion assumes that blocks are square, i.e. n=m. Non-square blocks, with n not equal to m, may be useful in situations where either the density of target points differs horizontally and vertically, or for better performance on computer architectures favoring coherent scan-line access. Block size defines the memory granularity, analogously to "memory alignment" in a ordinary 1D (one-dimensional) memory. Large block sizes decrease data overhead, as the next-block pointers use a fraction $2/n^2$ of the allocated space; and they also improve coherence. However, large block sizes increase wasted space, since whole blocks are allocated at a time. Wasted space may in turn worsen spatial localization. The appropriate choice of block size depends on the distribution of expected chunk lengths, as well as the spatial distribution of target points. Making the best choice is complex, and should in general be done by experiment using typical data.

Figure 12:
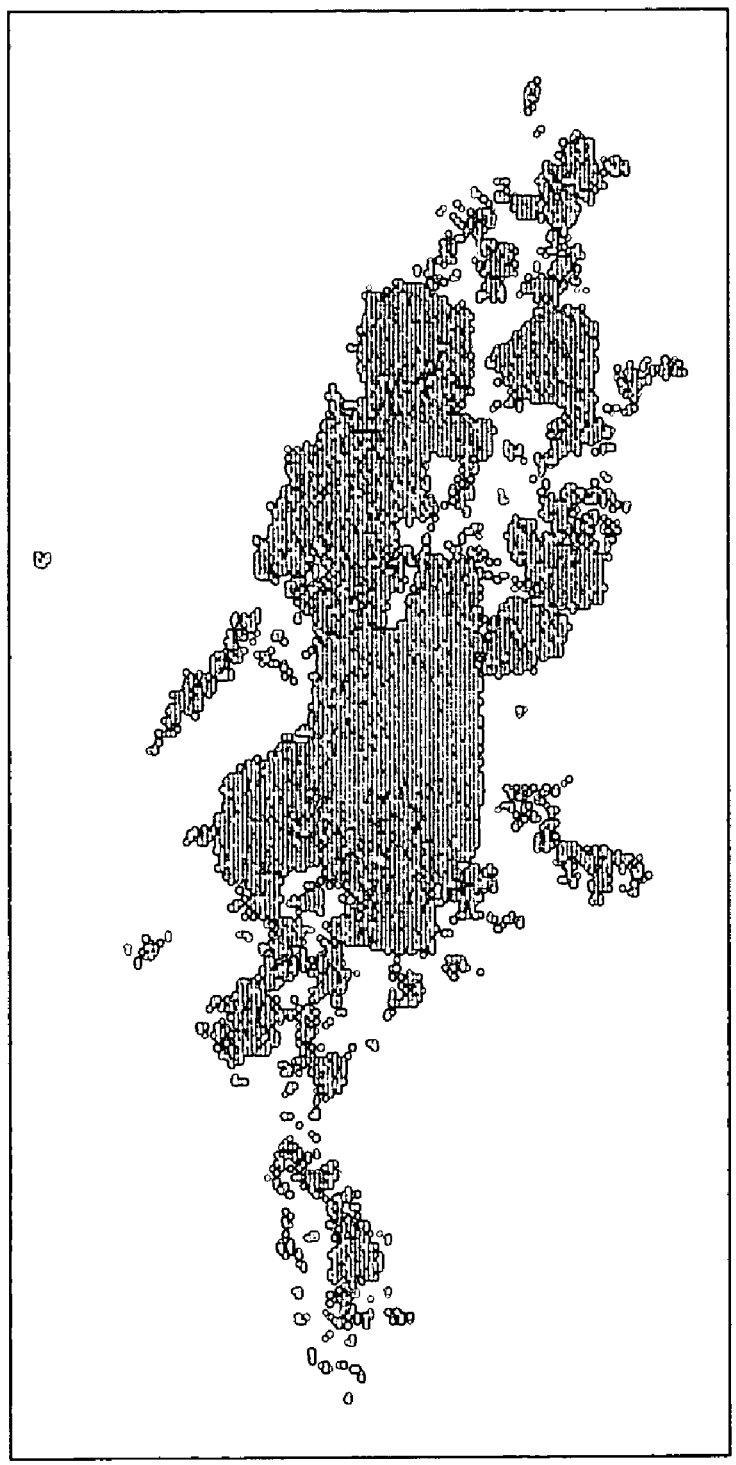
FIG. 12 depicts an image of one of the U.S. Virgin Islands which incorporates 6-pixel by 6-pixel size data blocks for use in accordance with one or more embodiments of the present invention.
Figure 13:
FIG. 13 depicts an image of one of the U.S. Virgin Islands which incorporates 8-pixel by 8-pixel size data blocks for use in accordance with one or more embodiments of the present invention.

For map-vector data, 4-pixel by 4-pixel blocks have been found to be a good size. The data overhead is one eighth of the total data, which is substantial, but tighter packing resulting from a reduced amount of wasted space preferably compensates for the increased overhead. FIGS. 11-13 show data images (enhanced for high contrast) for one of the U.S. Virgin Islands using 4*4 blocks (FIG. 11), 6*6 blocks (FIG. 12) and 8*8 blocks (FIG. 13). Wasted space is drawn as white in FIGS. 11-13 for the sake of clarity (though in practice, for improved compression performance, wasted space is assigned value zero, or black). Clearly the 8*8 blocks both waste a great deal of space and offer poor localization, whereas the 4×4 blocks waste much less space and localize better. The 4*4 block image of FIG. 11 also compresses to a smaller file size than the other two.

Note that a data structure is needed to keep track of which blocks are full, and to find the nearest empty block based on a target point and a previous block position. The R-tree (Antonin Guttman, R-Trees: A Dynamic Index Structure for Spatial Searching, SIGMOD Conference 1984: 47-57 which is incorporated herein by reference) provides an example of an efficient sparse data structure that can be used to solve this problem. It is also possible to simply use a bitmap, where "0" bits indicate free blocks and "1" bits indicate filled blocks. Both of these data structures can support striping, whereby only a fraction of the total image is kept in working memory at any given time. This allows very large spatial database images to be created offline. Because localization is well bounded, use of the database for subsequent spatial queries requires only that a small window be "visible" at a time.

Flattening Image Data

Figure 5A:
FIG. 5A is an image of binary 8-bit data taken from a dense region of roadmap data image of the Virgin Islands before the flattening of such data in accordance with one or more embodiments of the present invention.

For most forms of either lossy or lossless compression, performance can be optimized by making the image function small in magnitude, hence occupying fewer significant bits. Therefore, in some embodiments, special coding techniques are used to "flatten" the original data. The outcome of these techniques is apparent in FIG. 5, which shows the same densely populated region of a data image before flattening (FIG. 5A) and after flattening (FIG. 5B). The data image used in FIG. 5 is a roadmap data image of the Virgin Islands. It is noted that FIG. 5B has been deliberately darkened so as to be more visible in this application. In FIG. 5B as presented, the rectangular image as a whole is a faint shade of grey. Moreover, a small amount of the pixel value variation highly evident in FIG. 5A is still visible in FIG. 5B, mostly in the bottom half of the image. The consistency of the pixel values throughout the vast majority of the pixels of FIG. 5B bears witness to the effectiveness of the extent of the "flattening" of the data of FIG. 5A.

Note that before flattening, referring to FIG. 5A, the data image has full 8-bit dynamic range, and exhibits high frequencies and structured patterns that make it compress very poorly (in fact, a lossless JPEG2000-compressed version of this image is no smaller than the original raw size). After "flattening", most of the structure is gone, and a great majority of the pixels have values that are less than 8 and that can therefore be represented using just 3 bits. The corresponding JPEG2000 compressed version of the image has better than 3:1 compression.

"Flattening" can consist of a number of simple data transformations, including the following (this is the complete list of transformations applied in the example of FIG. 5):

The Flattening Technique Applied to FIG. 5

In the flattening technique of FIG. 5, 16-bit unsigned values, such as the width or height of the data block, would normally be encoded using a high-order byte and a low-order byte. We may use 16 bits because the values to be encoded occasionally exceed 255 (the 8-bit limit) by some unspecified amount. However, in the majority of cases, these values are do not exceed 255. For a value that fits in 8 bits, the high-order byte would be zero. Frequent zero high-order bytes followed by significant low-order bytes account for much of the 2-pixel periodicity apparent in parts of FIG. 5A. We can remap the 16 bits as shown in Table 2 below.

TABLE 2

| | first pixel (originally high-order byte) | | | | | | | | second pixel (originally low-order byte) | | | | | | | |
|---|---|---|---|---|---|---|---|---|---|---|---|---|---|---|---|---|
| orig. | 15 | 14 | 13 | 12 | 11 | 10 | 9 | 8 | 7 | 6 | 5 | 4 | 3 | 2 | 1 | 0 |
| new | 15 | 13 | 11 | 9 | 7 | 5 | 3 | 1 | 14 | 12 | 10 | 8 | 6 | 4 | 2 | 0 |
| place | 128s | 64s | 32s | 16s | 8s | 4s | 2s | 1s | 128s | 64s | 32s | 16s | 8s | 4s | 2s | 1s |

In Table 1, the left eight columns represent the first pixel of the pair, previously the high-order byte, and the rightmost eight columns represent the second pixel, previously the low-order byte. By redistributing the bits in this way, the range of accessible values (0-65535) remains unchanged, but the two bytes become much more symmetric. For example, for all 16-bit values 0-255, the two bytes each assume values <16.

Similar bit-interleaving techniques apply to 32-bit or larger integer values. These techniques are also extensible to signed quantities. For variables in which the sign changes frequently, as occurs for differential coding of a road vector, a sign bit can be assigned to position 0, and the absolute value can be encoded in alternating bytes as above. Note that to be drawn convincingly, road vector data may be represented at greater than pixel precision. Arbitrary units smaller than a pixel can instead be used, or equivalently, sub-pixel precision can be implemented using fixed point arithmetic in combination with the above techniques. In our exemplary embodiment, 4 sub-pixel bits are used, for 1/16 pixel precision.

When numbers are encoded as described above, it is desirable to make the numbers as small as possible. Sometimes context suggests an obvious way to do this. For example, since, in a preferred embodiment, each data block is 2 or more pixels wide, we can subtract 2 from the data width before encoding. More significantly, both pointers and any position vectors encoded in a data block are specified in pixels relative to the pointer position, rather than in absolute coordinates. This not only greatly decreases the magnitude of the numbers to encode, it also allows a portion of the data image to be decoded and rendered vectorially in a local coordinate system without regard for the absolute position of this portion.

In a preferred embodiment, for vector rendering of a sequence of points defining a curve (for example, of a road), only the first point need be specified relative to the original pointer position. Subsequent points can be encoded as "deltas", or step vectors from the previous point. After the second such point, additional subsequent points can be encoded as the second derivative, or the difference between the current and previous delta. Encoding using the second derivative is generally efficient for such structures as roads, since they tend to be discretizations of curves with continuity of the derivative. Otherwise stated, roads tend to change their direction gradually.

Alternative Flattening Technique

Another "flattening" technique is described in document (1) (which is attached hereto as Appendix A) for use with textual data, which would normally be encoded as ASCII, with a single character per byte. In the application described in (1), English text is being encoded, and hence the letters are remapped based on decreasing frequency of letter occurrence in a representative sample of English. The same technique can be used in this context, although the text encoded in a map, consisting mostly of street names, has quite different statistics from ordinary English. Numerals and capital letters, for example, are far more prominent.

Note that the particular methods for the encoding of pointers or data as presented above are exemplary; many other encodings are also possible. "Good" encodings generally result in images which are smooth and/or which have low dynamic range.

Using the techniques above, a roadmap of King County, Wash. at 15 meters (m) per pixel compresses as shown in Table 3 below.

TABLE 3

| Object | Size | Format |
|---|---|---|
| Original 2002 TIGER/Line vector data (TGR53033.ZIP) | 8089 KB | compressed ZIP file containing all vector data in tabulated text form |
| Uncompressed 8-bit image of rendered roadmap | 41.5 MB | raw, = 41.5 megapixels |

TABLE 3-continued

| Object | Size | Format |
|---|---|---|
| Prerendered roadmap layer | 2602 KB | JPEG2000 compressed at 0.5 bits/pixel |
| Pointer layer | 743 KB | JPEG2000, lossless (~0.18 bits/pixel) |
| Data layer | 3205 KB | JPEG2000, lossless (~0.77 bits/pixel) |
| Prerendered + Pointer +Data | 6550 KB | JPEG2000, lossy and lossless |

Surprisingly, the JPEG2000 representation of the map data (including lossy pre-rendered roadmap image, lossless pointer layer, and lossless data layer) is actually smaller than the compressed ZIP file representing the original data as tabulated text. (This file is part of the United States Census Bureau's 2002 TIGER/Line database.) Unlike the original ZIP file however, the new representation is ready to serve interactively to a client, with efficient support for continuously pannable and zoomable spatial access.

The original prerendered multiscale map invention introduced in document (2) (which is attached hereto as Exhibit B) included not a single prerendered image, but a stack of such images, rendered at progressively coarser resolutions and with rescaled weights for lines (or other visible features). Although no features are omitted from any of these prerenditions, some features are de-emphasized enough to be clearly visible only in an aggregate sense. For example, the local roads of a city become a faint grey blur at the statewide level.

One or more embodiments of the present invention can be extended to include pointer and data images corresponding to the coarser prerendered roadmap images, in which only a subset of the original vector objects are represented. For example, statewide pointer and data images, which are at much lower resolution than those used for prerendered images, might only include data for state and national highways, excluding all local roads. These coarser data may also be "abstracts", for example specifying only road names, not vectors. Images at different resolutions might include varying mixtures or subsets of the original data, or abstracted versions. This technique both allows all of the relevant data to fit into the smaller coarse images, and provides the client with the subset of the vector information relevant for navigation at that scale.

Although the implementation outlined above suggests an 8-bit grayscale prerendered map image at every resolution, the prerendered images may also be in color. Further, the prerendered images may be displayed by the client in color even if they are single-channel images, since the vector data can be used to draw important roads in different colors than the prerendered material. Finally, the prerendered images may omit certain features or roads present in the vector data, relying on the client to composite the image and vector material appropriately.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising: providing a first layer of an image, said first layer including features of said image having locations within said first layer; providing a second layer of said image, said second layer including data blocks corresponding to and describing respective ones of said features, each said data block being in a location in said second layer at least substantially corresponding to a location in said first layer of the feature corresponding to each said data block; and providing a third layer of said image, said third layer including pointers having locations in said third layer, each said pointer corresponding to a respective one of said features and a respective one of said data blocks, the location of each said pointer in said third layer at least substantially corresponding to the location in said first layer of the feature corresponding to each said pointer wherein said providing said second layer of said image comprises: locating each said data block employing a packing algorithm to achieve a maximum proximity of each said data block to a target location for each said data block in said second layer, said target location in said second layer corresponding to the location in said first layer of the feature corresponding to each said data block.

2. The method of claim 1 wherein said second layer and said third layer each have a size and shape corresponding to a size and a shape of said first layer.

3. The method of claim 1 further comprising: forming a map image from a combination of said first layer, said second layer, and said third layer.

4. The method of claim 3 further comprising flattening data in said map image.

5. The method of claim 1 wherein each said pointer indicates the location of each said pointer's corresponding data block with respect to each said pointer's location.

6. The method of claim 5 wherein said indicating comprises identifying an offset in two dimensions.

7. The method of claim 6 wherein each said dimension of said offset is expressed in pixels.

8. The method of claim 6 wherein said indicating comprises identifying an offset as a one-dimensional distance along a Hilbert curve.

9. The method of claim 8 wherein said offset along said one-dimensional curve is expressed in units of pixels.

10. The method of claim 8 wherein said offset along said one-dimensional curve is expressed in units corresponding to integral multiples of pixels.

11. The method of claim 1 wherein said maximum proximity is determined based on a shortest straight-line distance between each said data block's location and said target location for each said data block.

12. The method of claim 1 wherein said maximum proximity is determined based on a sum of absolute values of offsets in each of two dimensions between each said data block's location and said target location for each said data block.

13. The method of claim 1 wherein said maximum proximity is determined based on a minimum Hilbert curve length between each said data block's location and said target location for each said data block.

14. A computer readable storage medium encoded with one or more software programs that are operable to cause a processing unit to execute actions, comprising: providing a first layer of an image, said first layer including features of said image having locations within said first layer; providing a second layer of said image, said second layer including data blocks corresponding to and describing respective ones of said features, each said data block being in a location in said second layer at least substantially corresponding to a location in said first layer of the feature corresponding to each said data block; and providing a third layer of said image, said third layer including pointers having locations in said third layer, each said pointer corresponding to a respective one of said features and a respective one of said data blocks, the location of each said pointer in said third layer at least substantially corresponding to the location in said first layer of the feature corresponding to each said pointer, wherein said providing said second layer of said image comprises: locating each said data block employing a packing algorithm to achieve a maximum proximity of each said data block to a target location for each said data block in said second layer, said target location in said second layer corresponding to the location in said first layer of the feature corresponding to each said data block.

15. The computer readable storage medium of claim 14 wherein said second layer and said third layer each have a size and shape corresponding to a size and a shape of said first layer.

16. The computer readable storage medium of claim 14 wherein the processing unit executes the further action of: forming a map image from a combination of said first layer, said second layer, and said third layer.

17. The computer readable storage medium of claim 14 wherein each said pointer indicates the location of each said pointer's corresponding data block with respect to each said pointer's location.

18. The computer readable storage medium of claim 14 wherein said indicating comprises identifying an offset in two dimensions.

19. The computer readable storage medium of claim 14 wherein said maximum proximity is determined based on a shortest straight-line distance between each said data block's location and said target location for each said data block.

20. An apparatus including a computer readable storage medium encoded with one or more software programs, a processing unit operating under the control of said one or more software programs that are operable to cause the processing unit to execute actions, comprising: providing a first layer of an image, said first layer including features of said image having locations within said first layer; providing a second layer of said image, said second layer including data blocks corresponding to and describing respective ones of said features, each said data block being in a location in said second layer at least substantially corresponding to a location in said first layer of the feature corresponding to each said data block; and providing a third layer of said image, said third layer including pointers having locations in said third layer, each said pointer corresponding to a respective one of said features and a respective one of said data blocks, the location of each said pointer in said third layer at least substantially corresponding to the location in said first layer of the feature corresponding to each said pointer, wherein said providing said second layer of said image comprises: locating each said data block employing a packing algorithm to achieve a maximum proximity of each said data block to a target location for each said data block in said second layer, said target location in said second layer corresponding to the location in said first layer of the feature corresponding to each said data block.

21. The apparatus of claim 20 wherein said second layer and said third layer each have a size and shape corresponding to a size and a shape of said first layer.

22. The apparatus of claim 20 wherein the processing unit executes the further action of: forming a map image from a combination of said first layer, said second layer, and said third layer.

23. The apparatus of claim 20 wherein each said pointer indicates the location of each said pointer's corresponding data block with respect to each said pointer's location.

24. The apparatus of claim 23 wherein said indicating comprises identifying an offset in two dimensions.

25. The apparatus of claim 20 wherein said maximum proximity is determined based on a shortest straight-line distance between each said data block's location and said target location for each said data block.

* * * * *